(12) United States Patent
Brandner et al.

(10) Patent No.: US 9,337,497 B2
(45) Date of Patent: May 10, 2016

(54) LAYER STRUCTURE AND USE THEREOF TO FORM A CERAMIC LAYER STRUCTURE BETWEEN AN INTERCONNECT AND A CATHODE OF A HIGH-TEMPERATURE FUEL CELL

(75) Inventors: Marco Brandner, Oy-Mittelberg (DE); Johannes Schmid, Lechaschau (AT); Andreas Venskutonis, Reutte (AT); Nikolai Trofimenko, Dresden (DE); Viktar Sauchuk, Dresden (DE); Mihails Kusnezoff, Dresden (DE); Karin Lucke, Dresden (DE); Alexander Michaelis, Dresden (DE)

(73) Assignees: PLANSEE SE, Reutte (AT); FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 84 days.

(21) Appl. No.: 13/985,104

(22) PCT Filed: Feb. 14, 2012

(86) PCT No.: PCT/EP2012/052518
§ 371 (c)(1),
(2), (4) Date: Oct. 8, 2013

(87) PCT Pub. No.: WO2012/110516
PCT Pub. Date: Aug. 23, 2012

(65) Prior Publication Data
US 2014/0023957 A1    Jan. 23, 2014

(30) Foreign Application Priority Data
Feb. 15, 2011    (EP) .................................. 11001220

(51) Int. Cl.
*H01M 8/02*    (2006.01)
*B32B 18/00*    (2006.01)
(Continued)

(52) U.S. Cl.
CPC ............. *H01M 8/0236* (2013.01); *B32B 18/00* (2013.01); *C04B 35/01* (2013.01); *C04B 35/016* (2013.01);
(Continued)

(58) Field of Classification Search
CPC ................... Y02E 60/525; H01M 2008/1293; H01M 4/9033; H01M 8/0228; H01M 8/2425; H01M 4/8885; H01M 8/0217; H01M 8/0236
See application file for complete search history.

(56) References Cited

U.S. PATENT DOCUMENTS

| | | | |
|---|---|---|---|
| 6,469,612 B2 | 10/2002 | Nakayama et al. | |
| 8,366,972 B2 | 2/2013 | Kusnezoff et al. | |

(Continued)

FOREIGN PATENT DOCUMENTS

| | | |
|---|---|---|
| DE | 10150248 A1 | 6/2002 |
| DE | 102007018261 A1 | 10/2008 |

(Continued)

OTHER PUBLICATIONS

Kusnezodd et al.; Impact of Protective and Contacting Layers on the Long-Term SOFC Operation; CE&SP, XP008137657, vol. 30, No. 4, (Jan. 18, 2009), pp. 83-93.

(Continued)

*Primary Examiner* — Stewart Fraser
(74) *Attorney, Agent, or Firm* — Jacobson Holman, PLLC.

(57) ABSTRACT

The invention relates to a layer structure which is formed between an interconnect and a cathode of a solid oxide fuel cell and can be used for forming a ceramic layer structure between an interconnect and a cathode. In this respect, the interconnect comprises a metal alloy containing chromium. The object of the present invention is to provide a layer structure between an interconnect and a cathode of a solid oxide fuel cell with which a good protective function (from corrosion and from chromium vaporization), a high electrical conductivity and also a good thermal expansion behavior adapted to the materials of an interconnect and of a cathode can be achieved. The layer structure in the green state is formed by a powdery spinel as well as at least one of the below-named metal oxides CuO, NiO, $CoO_x$ and $MnO_x$ as a sintering additive and at least one powdery perovskite. In this respect, chromium is not contained in any of these chemical compounds and the portion of spinel contained with the metal oxides as a sintering additive is reduced starting from the side facing the interconnect up to the side facing the cathode and the portion of perovskite is reduced starting from the side facing the cathode in the direction of the side facing the interconnect.

17 Claims, 5 Drawing Sheets

(51) Int. Cl.
*C04B 35/01* (2006.01)
*C23C 24/08* (2006.01)
*C23C 28/04* (2006.01)
*H01M 8/12* (2016.01)

(52) U.S. Cl.
CPC ............ *C23C 24/08* (2013.01); *C23C 28/04* (2013.01); *H01M 8/021* (2013.01); *H01M 8/0217* (2013.01); *H01M 8/0228* (2013.01); C04B 2235/3213 (2013.01); C04B 2235/3227 (2013.01); C04B 2235/3265 (2013.01); C04B 2235/3275 (2013.01); C04B 2235/3279 (2013.01); C04B 2235/3281 (2013.01); C04B 2235/5436 (2013.01); C04B 2235/763 (2013.01); C04B 2235/768 (2013.01); C04B 2235/786 (2013.01); C04B 2235/79 (2013.01); C04B 2235/80 (2013.01); C04B 2237/34 (2013.01); H01M 2008/1293 (2013.01); Y02E 60/50 (2013.01); Y02E 60/525 (2013.01)

(56) References Cited

U.S. PATENT DOCUMENTS

| | | | |
|---|---|---|---|
| 2007/0259252 A1* | 11/2007 | Koc | 429/40 |
| 2009/0155667 A1 | 6/2009 | Kiefer | |
| 2010/0108953 A1* | 5/2010 | Kusnezoff et al. | 252/518.1 |
| 2011/0111327 A1* | 5/2011 | Ohmori et al. | 429/520 |
| 2011/0281194 A1* | 11/2011 | Higashi et al. | 429/458 |

FOREIGN PATENT DOCUMENTS

| | | |
|---|---|---|
| EP | 0866472 A2 | 9/1998 |
| EP | 2393148 A1 | 12/2011 |
| JP | 2008-081804 | 4/2008 |
| WO | WO 2010/087298 A1 | 8/2010 |
| WO | WO 2011/048307 A1 | 4/2011 |

OTHER PUBLICATIONS

Montero et al.; Development and characterization of a quasi-ternary diagram based . . . ; Solid State Ionics, XP026097616, vol. 180, No. 9-10, pp. 731-737.
Brylewski et al.; Perovskite and Spinel Functional Coatings for SOFC Metallic Interconnects; Materials Science Forum vols. 595-598 (2008) pp. 813-822.
S. Megel et al., CFY-Stack: from electrolyte supported cells to high efficiency SOFC stacks; 10th European SOFC Forum, Jun. 2012, pp. 18/135-28/135.
Yang et al. Influence of Nano-CuO Additive on Sinter Ability and Mechanical Properties of Ytrria-partially Stabilized Zirconia (Y-PSZ). China Ceramics, pp. 15-17, No. 4 of vol. 44, 2008.
Hefeng et al. Preparation and Research on Nano-NiO-Cu-NiFe2O4 Inert Anode. Engineering Technology vol. I of China Master's Theses Full-Text Database.
Jinhui et al. Effect of MnO2 on properties of Inert Anode of NiFe2O4 spinel. Function Materials, No. 3 of vol. 36, 2005.
Larring et al. Spinel and Perovskite Functional Layers Between Plansee Metallic Interconnect (Cr-5 wt% Fe-1 wt% Y2O3) and Ceramic (La0.85Sr0.15)0.91MnO3 Cathode Material for Solid Oxide Fuel Cells. Journal of Electrochemical Society, 147 (9) 3251-3256 (2000).
Tao et al. Study on Electrical Conductivity of NiFe2O4+Co3O4 Inert Anode Materials at Elevated Temperatures. Technological Innovation in Non-ferrous Metal Industry—the Monograph of the Seventh Academic Annual Conference held by the Nonferrous Metals Society of China, Oct. 2008.

* cited by examiner

LAYER STRUCTURE AND USE THEREOF TO FORM A CERAMIC LAYER STRUCTURE BETWEEN AN INTERCONNECT AND A CATHODE OF A HIGH-TEMPERATURE FUEL CELL

This is a national stage of PCT/EP12/052518 filed Feb. 14, 2012 and published in German, which has a priority of European no. 11001220.0 filed Feb. 15, 2011, hereby incorporated by reference.

The invention relates to a layer structure which is formed between an interconnect and a cathode of a high-temperature fuel cell and can be used for forming a ceramic layer structure between an interconnect and a cathode.

High-temperature fuel cells (solid oxide fuel cells or SOFC) allow a direct conversion of chemical energy into electrical energy. A central functional unit of such solid oxide fuel cells is the cathode-electrolyte-anode unit (single cell). It has two electrodes, the cathode and the anode which are separated from one another by an oxygen conducting (solid) electrolyte. Fuel (e.g. $H_2$, $CH_4$, CO, etc.) is supplied to the anode and an oxidizing agent (e.g. $O_2$, air, etc.) is supplied to the cathode in the operation of such a single cell. At an operating temperature in the range from 650 to 1000° C., oxygen ions are conducted from the cathode side through the oxygen-conducting electrolyte to the anode, where they react with the fuel. The electrical voltage which builds up between the anode and the cathode in this process is used as electrical energy. In order to achieve a sufficiently high electrical voltage level by a solid oxide fuel cell, a plurality of cathode-electrolyte-anode units (single cells) are connected in series with one another as a rule. For this purpose, interconnects or bipolar plates are used which form the connection member between the single cells. With the planar construction shape, the single cells (including the cathode, the electrolyte and the anode) as well as the interconnects are each configured substantially in plate form. The interconnects effect the electrical contact and the gas supply of fuel to the anode and of oxidizing agent to the cathode. In addition to the planar construction shape, other constructions shapes of the single cells and of the interconnects are also possible.

Different demands are made on the interconnect and on its bonding to the respective adjacent anode (of a first single cell) and to the respective adjacent cathode (of a second neighboring single cell). On the one hand, the thermal coefficient of expansion of the interconnect should be adapted as closely as possible to the ceramic solid oxide fuel cell to ensure a good thermomechanical compatibility with the other components of the solid oxide fuel cell, in particular with the cathode and the anode. Furthermore, the interconnect should establish a good electrical contact between the cathode and the anode and should be oxidation resistant at the high temperatures which occur in use. With the planar construction shape, open channels are provided at either side of the plate-shaped interconnect for the gas supply as a rule and the electrical contact takes place via the top surfaces of the contours of the interconnect forming the channels.

Only very few materials, as a rule metallic materials, can be considered for interconnects due to these demands. With the planar construction shape, in particular materials having a high chromium content such as alloys on a chromium basis or ferritic steels (alloys on an iron basis containing chromium) are considered for interconnects. It is a problem with these materials that at elevated temperatures under an oxidizing atmosphere, which conditions apply in the use of the solid oxide fuel cell, in particular at the cathode side, at the interconnect, a chromium(III) oxide film ($Cr_2O_3$) forms on the surface of the interconnect. At the high temperatures of use, the chromium oxide reacts with oxygen and water vapor while forming chromium trioxide ($CrO_3$ and chromium oxide hydroxides $CrO_2(OH)_2$/$CrO(OH)_4$. These newly formed compounds containing chromium have a high vapor pressure at the operating temperature of the solid oxide fuel cell and can thus easily enter into the cathode. These Cr species react with the cathode material there, which results in a change in its composition and, in the long term, effects a worsening of the catalytic activity of the cathode.

To prevent or minimize the chromium vaporization and as corrosion protection for the interconnect, it is known to provide a protective layer over the whole surface between the interconnect and the cathode, in particular at the cathode side on the interconnect. In addition, such a protective layer should have a high electrical conductivity so that a good electric contact is enabled over it between the interconnect and the cathode. It is furthermore known to provide corresponding contact layers between the interconnect and the cathode for the electrical contact, which contact layers have a high electrical conductivity and also ensure a good bond to the cathode at the high temperatures in use. Such contact layers do not necessarily have to be formed over the whole surface, but can only be provided, for example, at the current-conductive contact surfaces between the interconnect and the cathode.

A material for protective layers on substrates is known from document DE 10 2007 018 261 A1 which is resilient to high temperatures and forms chromium oxide and is formed from a spinel phase and a secondary oxide phase. In a manufacturing process described in document DE 10 2007 018 261 A1, a heat treatment takes place of copper(II) oxide (CuO), nickel(II) oxide (NiO) and manganese(III) oxide ($Mn_2O_3$)/iron(III) oxide ($Fe_2O_3$), each present in powder form, at air or at an atmosphere containing oxygen.

It is known from US 2009/155667 A1 to form a carrier layer and a protective layer on an interconnect (bipolar plate). The protective layer should in this respect be formed with at least one ternary oxide system. Oxides of Mn, Co, Fe and Cu are named as the oxides. The problem caused by the diffusion or vaporization of chromium should thereby be counteracted. This is, however, only achieved insufficiently. In addition, the electrical conductivity of these protective layers is limited and the thermal expansion behavior cannot be adapted to a sufficient degree with respect to the interconnect and also with respect to the cathode so that damage such as cracks can occur which impair the protective function.

EP 2 393 148 A1, which is based on WO 2010/087298 A1, relates to a structure having two layers which are to be formed between an interconnect and a cathode of fuel cells. In this respect, ZnO must be contained in a first layer and a (La, Sr)MnO$_3$ perovskite in a second layer. Further oxide components such as $ZnMn_2O_4$ and $MnCo_2O_4$ can admittedly be contained in the first layer; however, no perovskite should be contained. No ZnO should in turn be contained in the second layer. The electrical conductivity of the first layer in particular gives rise to problems in this technical solution. However, too small an electrical conductivity is achieved by the use of ZnO, which very negatively influences the efficiency of fuel cells.

A semiconductor ceramic material having negative temperature coefficients of resistance and such a thermistor are described in DE 101 50 248 A1.

The disclosure of EP 0 866 472 A2 likewise relates to a thermistor.

It is known from T. Brylewski et al. from "Perovskite and spinel functional coatings for SOFC metallic interconnects"; MATERIALS SCIENCE FORUM, TRANS TECH PUBLI- CATIONS LTD-SWITZERLAND, CH, Vol. 595-598, No. Part 2, Jan. 1, 2008 (2008-01-01), pages 813-822, XP008137667, ISSN: 0255-5476 to reduce the vaporization rate of chromium using spinel and perovskite layers. It is proposed therein to use $Mn_{1.5}Cr_{1.5}O_4$ or $MnCo_2O_4$ for spinels. However, it is not possible using these known technical solutions to satisfy the important demands sufficiently overall, namely a thermal expansion behavior adapted to the materials of an interconnect and of a cathode, a high electrical conductivity and also the diffusion and vaporization problem of chromium.

In "Development and characterization of a quasi-ternary diagram based on $La_{0.8}Sr_{0.2}(Co, Cu, Fe)O_3$ oxides in view of application as a cathode contact material for solid fuel cells", SOLID STATE IONICS, NORTH HOLLAND PUB. COMPANY, AMSTERDAM; NL, Vol. 180, No. 9-10, May 29, 2009, pages 731-737, XP026097616, ISSN: 0167-2738, DOI: 10.1016/J.SSI.2009.03.006, investigations were presented by K. Montero et al. in which spinels and perovskites having different compositions were considered as the contact layer and a protective layer of a spinel (MCF) having $MnCo_{1.9}Fe_{0.1}O_4$. In this respect, in particular the influence of copper in perovskite was examined.

The object of the present invention is to provide a layer structure between an interconnect and a cathode of a solid oxide fuel cell with which a good protective function (from corrosion and from chromium vaporization), a high electrical conductivity and also a good thermal coefficient of expansion adapted to the materials of an interconnect and of a cathode can be achieved.

In addition, the manufacture should be possible inexpensively.

In accordance with the invention, this object is achieved by a layer structure having the features of claim 1. In accordance with claim 10, the layer structure can be used for forming a ceramic layer structure. Advantageous further developments of the invention can be achieved using technical features given in subordinate claims. The layer structure in accordance with the invention, which is formed between an interconnect and a cathode of a solid oxide fuel cell, is formed in the green state using a powdery spinel as well as at least one metal oxide which is selected from CuO, NiO, $CoO_x$ and $MnO_x$ as a sintering additive and at least one powdery perovskite. In this respect, chromium is not contained in any of these chemical compounds. In addition, Zn, in particular ZnO, should also not be contained. The interconnect comprises a metal alloy containing chromium such as is customary according to the prior art.

The portion of contained spinel with the metal oxides as a sintering additive is reduced starting from the side facing the interconnect up to the side facing the cathode. The situation is reversed for the portion of perovskite and the portion of perovskite reduces starting from the side facing the cathode in the direction of the side facing the interconnect.

This can be achieved most simply when the layer structure is formed from at least two part layers having different consistencies. There is, however, also the possibility of varying the respective portions continuously from one side of the layer structure to the oppositely disposed side.

A non-stoichiometric perovskite can preferably be used as the perovskite in which the $A^p$ lattice site of the perovskite crystal structure $A^pB^pO_3$ is occupied by at least one metal from the group of chemical elements La, Sr, Ca and Y and the $B^p$ lattice site is occupied by at least one metal of the group of chemical elements Mn, Ni, Co and Fe.

The electrical conductivity can be further increased by the non-stoichiometry of the perovskite and an improved adaptation of the thermal coefficient of expansion to the other elements can be achieved.

$(Cu_{xs}Ni_{1-xs})_{ys}(Mn_{1-zs}Fe_{zs})_2O_4$ where $0 \leq xs \leq 1.0$, $0.8 \leq ys \leq 1.2$ und $0.0 \leq zs \leq 1.0$ can advantageously be contained as the spinel and $(Ln^p_{1-xp}E^p_{xp})_{1-zp}M^pO_{3-\delta}$ where $0 \leq xp \leq 0.35$, $0.0 \leq zp \leq 0.03$ can advantageously be contained as the perovskite. In this respect $Ln^p$ is at least one metal from the group of rare earths, $E^p$ is at least one metal from the group of alkaline earth metals and $M^p$ is at least one metal from the group of transition metals.

It is favorable if the region of the layer structure directly contacting the cathode or a third part layer arranged there is formed only by perovskite. A particularly good bond to the cathode can thus be achieved both as regards the electrical conductivity and the thermal coefficient of expansion.

After a heat treatment leading to sintering, a ceramic layer structure is manufactured between an interconnect and a cathode of a solid oxide fuel cell by the use of this layer structure with green strength. This ceramic layer structure is formed with one spinel phase and at least one perovskite phase. Remainders of at least one of the metal oxides CuO, NiO, $CoO_x$ and $MnO_x$ named in the following can still be contained.

The portion of spinel contained is reduced starting from the side facing the interconnect to the side facing the cathode. This applies in a similar manner to the portion of perovskite which likewise reduces starting from the side facing the cathode in the direction of the side facing the interconnect. The ceramic layer structure has a porosity ≤25% and/or a mean pore diameter ≤1 μm over a thickness of at least 10 μm in the interface region to the interconnect. In addition, the porosity of the ceramic layer structure can be enlarged in the direction of the cathode.

The portions, the porosity and the pore size can vary continuously, but also in steps, in the respective directions. On a stepped variation, a ceramic layer structure is formed from a plurality of corresponding part layers.

A particularly good adaptation of the thermal coefficient of expansion, in particular with respect to the interconnect material, can be achieved by a suitable selection of contained portions of CuO and NiO.

Ceramic sintered layers which have at least one spinel phase have proven themselves as protective layers for interconnects. The layer in accordance with the invention can be manufactured in a very simple manner. Only the corresponding powder particles have to be provided to manufacture the layer and have to be applied as a layer to a corresponding substrate (e.g. interconnect or cathode). The cohesion of the powder particles in the layer can take place by means of a liquid, by means of a binding agent, electrostatically, etc. No cost-intensive application processes such as plasma spraying, in which a comparatively high waste of starting powder occurs, CVD, PVC, etc. have to be used for the application of the layer. A simple application process (e.g. wet spray processes, roll coating, dip coating, etc.) can rather be selected in which the layer can be applied to the corresponding substrate in a comparatively high thickness and without a high powder waste. In this respect, comparatively thick ceramic sintered layers can also be achieved by sintering. It has been shown that by adding sintering additive powder particles to spinel powder particles in the layer structure in accordance with the invention (in the green state) a ceramic sintered layer structure is obtained after the sintering of said particles which has a low porosity over large layer thicknesses, in particular at the side facing the interconnect, and an increased porosity in the direction of the side facing the cathode. These advantageous properties were not able to be achieved in previous ceramic sintered layers of this kind. In particular in cases in which a layer of this kind does not contain any sintering additive, the ceramic sintered layer (which likewise has a spinel phase) which can be obtained by sintering this layer has a considerably higher porosity. Furthermore, it has proved advantageous with respect to the properties (protective function, high electrical conductivity) of the ceramic sintered layer structure that, in accordance with the invention, the sintering additive and the spinel are each contained in the green state in the layer as separate powder particles (i.e. as particles present separately from one another). The low porosity which can be achieved in accordance with the invention in the sintered ceramic layer structure over comparatively high layer thicknesses is in particular advantageous with respect to the protective functions of the layer (minimization of the chromium vaporization, corrosion protection) and with respect to a high electrical conductivity. The protective function of the ceramic sintered layer structure is also at least partly effected in that the spinel phase reacts with and binds the oxide compounds containing chromium released from the interconnect at the high temperatures present in the use of the solid oxide fuel cell and in the oxidizing operating atmosphere. Chromium can be chemically bound in the interface region between the layer structure and the interconnect, which will have to be looked at in the following, which results in a further increased density which improves the barrier effect for chromium discharged from the interconnect material. $CrO_3$ with $Mn_2O_3$ can, for example, become $MnCr_2O_4$.

Chromium can also be bound in $Cu,Ni(MnCr)_2O_4$ in a region of the ceramic layer structure directly adjacent to the surface of the interconnect. The chemical reactions can run on the heat treatment resulting in the sintering and also during the actual fuel cell operation. This can take place up to a degree of saturation at which these chemical reactions can no longer run. A correspondingly sufficient thickness and a dense layer is then formed at the surface of the interconnect in the ceramic layer structure and can prevent the unwanted discharge of chromium.

Where it is mentioned in the present connection that the layer (in the green state) and/or the powder particles used in the manufacture of the layer has/have "at least" specific, explicitly stated powder particles (e.g. spinel powder particles, sintering additive powder particles and/or perovskite powder particles), this means that in addition (in addition to the explicitly named powder particles), e.g. also still further powder particles and, optionally, if there is not an explicit restriction to powder particles, also further substances, materials, etc., can also be contained, except for the already excluded ones (Cr and ZnO). It applies accordingly when it is mentioned in the present connection that the ceramic sintered layer structure has "at least" specific, explicitly stated phases (e.g. a spinel phase, a perovskite phase and/or a metal oxide phase) that the ceramic sintered layer structure can also have still further phases in addition to the explicitly named phase(s).

It should in each case be expressed by "spinel" that the respective substance (here: spinel powder particles and spinel phase) is formed by an oxide compound of at least one metal (in many cases of at least two metals) and is present in the spinel crystal structure. The general sum formula of a spinel in this respect should be $A^sB^s_2O_4$, where $A^s$ and $B^s$ are each lattice sites in the spinel crystal structure occupied by metals. The formation of the spinel phase during the step of sintering takes place while at least partly installing the metal oxide(s) of the sintering additive into the spinel structure of the spinel powder particles or of the spinel phase. The spinel powder particles and correspondingly also the spinel phase do not necessarily have to be exactly stoichiometric. "Sintering" is understood in the present case as a heat treatment of the layer structure in a temperature range in which no molten liquid phase is formed within the layer structure. The temperature should in particular be so high that solid body reactions can run through diffusion processes. A sintered ceramic layer structure can in particular be recognized by the fact that a pronounced diffusion zone is present between the ceramic layer structure and the substrate (interconnect).

The features of the layer structure given in claim 1 are present before this layer structure is subjected to the step of sintering (green state). The excellent properties with respect to the protective function and the contact are only achieved after the sintering of the layer structure with a ceramic sintered layer structure obtained therefrom. The properties of the ceramic sintered layer structure are in this respective decisively determined by the layer structure in the green state. The layer structure in the green state can first be sintered on the corresponding substrate (interconnect and/or cathode) and can be used in this state. Alternatively, a delivery can take place in the green state and the process step of sintering only takes place after the joining together of a plurality of cathodes, electrolytes, anodes and interconnects to form a fuel cell stack (which is carried out by another manufacturer as a rule). It must be noted with respect to the ceramic sintered layer structure that the latter can increasingly be enriched with material from the interconnect, in particular with oxide compounds containing chromium, at high temperatures, i.e. as soon as at the first sintering and with increasing duration of use in the solid oxide fuel cell.

The hold (or the adhesion) of the ceramic sintered layer structure on the substrate (e.g. on the interconnect, but the cathode is also possible) is achieved by formation of a diffusion compound during the heat treatment resulting in the sintering. In a corresponding manner, a diffusion compound can also be formed between the ceramic layer structure and a second component (cathode or interconnect) to be connected to the ceramic layer structure by sintering thereof in the joined together state. With the interconnect, the formation of the diffusion compound is assisted inter alia by that chromium which is contained in the interconnect and which diffuses in part during the sintering into the layer structure, reacts there and can be chemically bound. With the cathode, the formation of the diffusion compound is facilitated by a suitable adaptation of the material of the layer structure to the material of the cathode.

The ceramic sintered layer structure obtained from the layer structure (in the green state) can be considered as a protective layer and/or as a contact layer. For an effect as a protective layer, a total surface of the interconnect at the cathode side, preferably flat (and optionally having contours) and optionally also the side surfaces of the interconnect should be covered (the layer structure in the green state and correspondingly also the ceramic sintered layer structure obtained therefrom). With a contact layer function, only the current-conductive contact surfaces of the interconnect can be covered. These possibilities exist independently of the specific form of the interconnect and of the cathode. A plate-like shape of the interconnect and of the cathode is preferred, with alternatively a tubular or corrugated shape also being possible. There is generally the possibility of providing a single ceramic sintered layer structure which can satisfy the functions of a protective layer and of a contact layer in one or also of providing a layer compound in which the functions of protection and contact are at least partly divided among two or more part layers of the layer compound arranged above one another. Since the electrical current conduction takes place between the interconnect and the cathode through all part layers, where possible all part layers should have good electrical conductivity. The layer structure can generally be applied to the interconnect or to the cathode as the substrate directly or indirectly on an already present layer. It is preferred that the layer structure is directly applied to the interconnect as the substrate or optionally that all part layers forming the layer structure are applied above one another on the interconnect as the substrate.

In accordance with a further development, the powder particles contained in the layer are formed exclusively (apart from impurities) by spinel powder particles and sintering additive particles (i.e. no further substances containing metals are contained). In this case, the metal oxide(s) of the sintering additive is/are installed, in particular completely, into the spinel structure of the spinel powder particles or of the spinel phase during the step of sintering. The ceramic sintered layer structure obtained by sintering the layer structure is accordingly only formed by a spinel phase (apart from negligible further phases with small portions). In accordance with a further development, the powder particles contained in the layer can be formed by 65% by mass to 90% by mass of spinel powder particles and the remaining portion can be formed by sintering additive powder particles. In accordance with a further development, the sintering additive powder particles can be formed by one or more individual metal oxides (or singular metal oxides) from a corresponding plurality of metals $M^a$. In this respect an individual metal oxide should be understood as a metal oxide which in each case only contains one single metal and does not form a solid solution with a further metal. The individual metal oxides are in particular each present as separate powder particles.

In accordance with a further development, the powder particles contained in the layer structure can be bound into a holding matrix formed from a binder.

The binder in this respect serves to hold the powder particles in the layer structure together (in the green state). In this manner, simply configured application processes can be used for applying the layer structure and the handling of the layer structure in the green state can be facilitated. The binder vaporizes in the step of sintering. In particular organic temporary binders are suitable as the binder which are removed in the step of sintering such as ethyl cellulose, polyvinyl alcohols, polyvinyl butyral, etc.

In accordance with a further development, the powder particles contained in the layer structure are free of chromium (except for impurities). In this manner, the compounds contained in the ceramic sintered layer structure, in particular the spinel phase, are also initially largely free of chromium. It can thereby take up relatively high quantities of oxide compounds, which contain chromium and which are discharged from the interconnect, during use.

In accordance with a further development, the spinel powder particles are of an oxide compound of at least one metal, in particular of at least two metals, from the group of elements Cu (copper), Ni (nickel), Mn (manganese), Co (cobalt) and Fe (iron). It must be taken into account in this respect that spinels are in most cases formed by metal oxides of at least two metals, with metal oxides of a single metal (e.g. Mn, Co) also being able to be present in the spinel crystal structure. In general, metals of the transition metals are very suitable for the spinel powder particles, wherein with the named chemical elements of this group particularly good results can be achieved with respect to the protective function and the electrical conductivity and these chemical elements are additionally inexpensive to obtain. At least some of the named metals Cu, Ni, Mn, Co and Fe can in this respect each be seated both on the $A^s$ lattice site and additionally or alternatively also on the $B^s$ lattice site of the spinel crystal structure. In accordance with a further development, the $A^s$ lattice sites and $B^s$ lattice sites of the spinel crystal structure are occupied by more than 50%, in particular by more than 80% (of the available $A^s$ and $B^s$ lattice sites) by at least two elements of the group Cu, Ni, Mn, Co and Fe. The oxide compound of the spinel powder particles is in particular exclusively (except for impurities) formed from metals of this group. In accordance with a further development, the $A^s$ lattice site is continuously occupied by Cu and/or Ni and the $B^s$ lattice site is continuously occupied by Mn and/or Fe (except for impurities). The given preferred elements and their portions are equally preferred for the spinel phase of the ceramic sintered layer structure.

In accordance with a further development, the metal oxide(s) of the sintering additive powder particles can be selected so that an installation of the metal oxide(s) of the sintering additive into the spinel structure of the spinel powder particles is promoted during the sintering and a low porosity is thereby achieved over high layer thicknesses in the ceramic sintered layer structure. In accordance with a further development, this can be achieved in that at least one of the metals $M^a$ contained in the sintering additive powder particles coincides with at least some of the at least one metal, in particular of the at least two metals, of the oxide compound of the spinel powder particles. In this respect, in particular all the metals (apart from impurities) contained in the oxide compound of the spinel powder particles can also be contained in the sintering additive powder particles. The metals contained in the sintering additive powder particles and coinciding with the metals of the spinel powder particles should in particular be present in the same stoichiometric quantity ratio as in the spinel powder particles. In addition, the sintering additive powder particles can additionally also contain even further metals. In accordance with a further development, at least one metal from the group Cu, Ni, Mn, Co and Fe should be contained in the sintering additive powder particles. The sintering additive powder particles can in particular be formed exclusively (except for impurities) from metal oxides (in particular of individual metal oxides) of metals of this group.

In accordance with a further development, the layer structure can have perovskite powder particles of an oxide compound of at least two metals. The addition of perovskite powder particles in this respect has the effect that the ceramic sintered layer structure obtained by sintering the layer structure has a perovskite phase, and as a rule also a metal oxide phase, in addition to the spinel phase. The provision of the perovskite powder particle in the layer in the green state and accordingly of the perovskite phase in the ceramic sintered layer structure allows a good bond to the cathode which is as a rule likewise formed from a perovskite. The formation of an adhering diffusion compound between the ceramic layer structure and the cathode is in particular hereby promoted. In addition, perovskites are characterized by a high specific electrical conductivity. As the perovskite portion in the ceramic sintered layer structure increases (which can be achieved by a correspondingly higher portion of perovskite powder particles in the layer structure in the green state), the porosity of the ceramic layer structure in the direction of the cathode can increase. The composition of the perovskite powder particles and accordingly of the perovskite phase can in particular be selected such that a good bond to the cathode is promoted. This is in particular the case when the same composition or a similar composition is selected which is also present in the perovskite of the cathode. The ceramic sintered layer structure which can be obtained in accordance with this further development and which also has a perovskite phase can generally be used both as a protective layer and as a contact layer. In accordance with a further development, it can be used as a contact layer. The bond to the cathode in particular takes place directly via it.

"Perovskite" is in each case intended to express that the respective substance (here: perovskite powder particles and perovskite phase) is formed by an oxide compound of at least two metals and is present in the perovskite crystal structure. The general sum formula of a perovskite is $A^P B^P O_3$, where $A^P$ and $B^P$ are each lattice sites in the perovskite crystal structure occupied by metals. The perovskite powder particles and correspondingly also the perovskite phase do not necessarily have to be exactly stoichiometric. In accordance with a further development, both the perovskite powder particles and the perovskite phase are each a hypostoichiometric perovskite. In this respect, in particular the $A^P$ lattice site is underoccupied. The electrical conductivity can thereby be further increased and the adaptation to the thermal expansion behavior can be improved.

The "metal oxide phase" can form when perovskite powder particles are also contained in the layer structure in the green state in addition to the spinel powder particles and the sintering additive powder particles. The metal oxide phase can be formed by at least one reaction product of at least some of the spinel powder particles, some of the sintering additive powder particles and some of the perovskite powder particles. The relative portion of the metal oxide phase within the ceramic sintered layer structure and the portions of the different starting powder in the metal oxide phase can vary greatly in dependence on the composition and relative portions of the starting powders (the case may possibly occur that the metal oxide phase is not formed). The crystal structure and/or the composition of the metal oxide phase can also vary locally. The protective function of the ceramic sintered layer structure, which can also have a perovskite phase and a metal oxide phase, is effected at least in part in that the spinel phase and the metal oxide phase react with and thus chemically bond the oxide compounds containing chromium and released from the interconnect at the high temperatures present in the use of the solid oxide fuel cell and in the oxidizing operating atmosphere.

In accordance with a further development, in the perovskite powder particles (and accordingly in the perovskite phase), the $A^P$ lattice site of the perovskite crystal structure is occupied by at least one metal from the group of rare earths and/or alkaline earth metals and the $B^P$ lattice site is occupied by at least one metal from the group of transition metals. In this respect, good results could in particular be achieved with respect to the protective function and the electrical conductivity when the $A^P$ lattice site is occupied by at least one metal from the group of elements La, Sr, Ca and Y and the $B^P$ lattice site is occupied by at least one metal from the group of elements Mn, Cu, Ni, Co and Fe.

In accordance with a further development, the layer structure (in the green state) is formed by at least two part layers formed on one another, wherein the first part layer has a lower portion (in particular no portion or almost no portion) of perovskite powder particles than the second part layer.

Accordingly, the ceramic sintered layer structure obtained therefrom also has at least two part layers in which the first part layer has a lower portion of the perovskite phase than the second part layer. In a corresponding manner, more than two part layers having an increasing perovskite portion can also be provided. Accordingly, a perovskite gradient can be set in the ceramic sintered layer structure such that the part layer bonded or to be bonded to the interconnect has the lowest perovskite portion (in particular no perovskite portion) and the part layer bonded or to be bonded to the cathode has the highest perovskite portion. A porosity gradient can thereby also be achieved from a low porosity in the region of the interconnect to a higher porosity in the region of the cathode. In this manner, the first part layer can be ideally adapted to the interconnect with respect to the protective function to be provided and to the thermal coefficient of expansion. The part layer to be bonded to the cathode can be ideally adapted to the cathode with respect to the material properties, to the thermal coefficient of expansion and with respect to a good formation of a diffusion compound. Furthermore, a good transition of these properties, which is as continuous as possible, can be achieved with a plurality of part layers. The part layer directly bonded to the interconnect preferably areally covers the total surface (optionally having contours) of the interconnect at the cathode side. Provision can be made with at least one part layer which is formed thereabove and which can serve as a contact layer that it only covers the current-conductive contact surfaces of the interconnect.

The portions of the different phases in the ceramic sintered layer structure and their stoichiometry can be influenced by the quantity ratio and the stoichiometry of the starting powders in the layer structure in the green state. The portions of the spinel phase and of the perovskite phase can in particular largely correspond to the quantity ratio of the spinel starting powder and perovskite starting powder within the layer structure in the green state. The stoichiometry of the spinel phase can also largely correspond to the stoichiometry of the spinel powder particles and the stoichiometry of the perovskite phase can largely correspond to the stoichiometry of the perovskite powder particles. It can be taken into account both with respect to the portions and to the stoichiometry that, due to the diffusion processes and solid body reactions which occur during sintering, a portion of the sintering additive powder particles is installed in the spinel phase and that a portion of the sintering additive powder particles, of the spinel powder particles and of the perovskite powder particles is installed in the metal oxide phase or said portions form this metal oxide phase. In accordance with a further development, the powder particles contained in the layer structure are formed at least in the region of the first part layer by a portion of 65% by mass to 95.8% by mass from spinel powder particles, by a portion of 4% by mass to 29% by mass from sintering additive powder particles and by a portion of 0.1% by mass to 6% by mass from perovskite powder particles. The ceramic sintered layer structure which can be obtained from this can in particular form a protective layer since these composition ranges are particularly advantageous with respect to the protective function with respect to chromium. Such a layer structure between the interconnect and the cathode can generally, but also exclusively, be used both as a protective layer and as a contact layer. In particular no perovskite powder particles should be contained in this part layer.

In accordance with a further development, the powder particles contained in the layer are formed at least in the region of the second part layer by a portion of 50% by mass to 99.8% by mass from perovskite powder particles, by a portion of 0.1% by mass to 45% by mass from spinel powder particles and by a portion of 0.1% by mass to 5% by mass from sintering additive powder particles. The ceramic sintered layer structure obtained therefrom can in particular form a contact layer since these composition ranges are particularly advantageous with respect to a bonding to the cathode which is as good as possible. Such a layer between the interconnect and the cathode can generally, but also exclusively, be used both as a protective layer and as a contact layer.

A ceramic sintered layer structure which has been manufactured using a layer structure in accordance with the invention has at least one spinel phase. Furthermore, a thickness is observed at least sectionally (with respect to the layer extent) of at least 10 µm and (in the respective at least one section) a porosity of ≤25 vol. %, in particular of ≤20 vol. %, is observed over a thickness of at least 10 µm. Where this region is directly adjacent to the surface of the interconnect. Such a ceramic sintered layer structure can in particular be obtained by sintering the above-described layer structure present in the green state (or can be obtained therefrom by sintering), wherein said layer structure can optionally be formed in accordance with one or more of the above-described further developments and/or variants. As described above, the ceramic sintered layer structure is in particular characterized by its good protective function and a good electrical conductivity. A thickness of the ceramic sintered layer structure of at least 10 µm with a porosity ≤25% can in particular be achieved in that first a correspondingly thick layer is applied in the green state (e.g. in the range from 20 µm-70 µm), with a volume reduction of this layer due to the sintering process having to be taken into account. Further details on the manufacture of the ceramic sintered layer structure can be taken from the passages above on the layer structure in the green state as well as from the manufacturing processes explained below for a ceramic sintered layer structure.

In accordance with a further development, the ceramic sintered layer structure should at least sectionally have a thickness of 10 µm and should have a porosity of ≤15 vol. %, in particular of ≤10 vol. % over a thickness of at least 10 µm. Such particularly low porosities should occur in ceramic sintered layer structures in accordance with the invention, in particular in the height region or thickness region directly adjacent to the interface to the substrate (e.g. interconnect).

It is not absolutely necessary that the ceramic sintered layer structure has a uniform thickness over its total extent. Variations in the thickness can in particular occur when this ceramic layer structure is applied to a substrate which has an uneven surface contour. The thickness of the ceramic layer structure should in particular amount to ≤800 µm, preferably ≤100 µm, over the total region. In accordance with a further development, the ceramic layer structure should have a thickness in the range from 20 µm-70 µm, in particular in the range from 20 µm-50 µm, where these thickness regions should be present at least in the region of the current-conductive contact surfaces. They should in particular be present continuously over the total layer extent. In the above-stated thickness regions, the porosity should in particular be observed, at least over a thickness of at least 10 µm, ≤25 vol. %, in particular ≤20 vol. % (sectionally or preferably over the total layer extent). In the regions between the current-conductive contact surfaces, in particular in the recesses formed between the elevated portions, along which the respective gas is conducted, the thickness can optionally also be smaller or alternatively also higher (depending on the application process) than in the region of the current-conductive contact surfaces. Layer thicknesses within the given regions are in particular advantageous with respect to the ensuring of a good protective function by the ceramic layer structure, with respect to the robustness of the ceramic layer structure and also with respect to the manufacture of the ceramic layer structure. Layers of this thickness can be manufactured simply, in a secure process and inexpensively in that a suspension or paste of the respective starting powder is manufactured and is then applied to the substrate.

With ceramic sintered layer structures formed in accordance with the invention, a smaller mean pore diameter can be achieved in comparison with conventional ceramic sintered layers. In accordance with an alternative to the given maximum porosities, the ceramic sintered layer structure has, at least sectionally and over a thickness of at least 10 µm, a mean pore diameter of ≤1 µm, in particular of ≤0.8 µm. A ceramic sintered layer structure obtained in this manner can be very compact and the crystallites contained therein can also be relatively small. These properties are in particular advantageous with respect to the protective function and with respect to the electrical conductivity.

Furthermore, in ceramic sintered layer structures in accordance with the invention, a smaller mean grain size of the spinel phase can be achieved in comparison with conventional ceramic sintered layers. In accordance with a further development, the spinel phase can have a mean grain size of ≤2 µm, in particular of ≤1.5 µm, at least sectionally in the ceramic sintered layer structure (with respect to the ceramic sintered layer) and over a thickness of at least 10 µm. This fine-crystalline configuration of the spinel phase is advantageous with respect to the protective function and to the electrical conductivity of the ceramic sintered layer structure.

In accordance with a further development, the ceramic sintered layer structure can have a porosity of ≤25 vol. %, in particular of ≤20 vol. %, over the total layer thickness amounting to at least 10 µm. In accordance with a further development, the above-stated properties with respect to the mean pore diameter and/or with respect to the mean grain size of the spinel phase can also each be observed over the total layer thickness amounting to at least 10 µm. In accordance with a further development, these properties of the porosity, of the mean pore diameter and/or of the mean grain size of the spinel phase can be present over the total layer extent of the ceramic sintered layer. If the ceramic sintered layer structure has two or more part layers (as will be explained in detail below), the above-given properties of the porosity, of the mean pore diameter and/or of the mean grain size of the spinel phase are present at least in the first part layer (explained in detail below) which has a very small portion or at least almost no perovskite phase.

The respective measuring processes which can be used for determining the porosity, the mean pore diameter and the mean grain size will be explained below, partly with respect to FIGS. 7 and 8.

In accordance with a further development, the spinel phase can be formed in accordance with the formula $(Cu_{xs}Ni_{1-xs})_{ys}(Mn_{1-zs}Fe_{zs})_2O_4$, where $0 \leq xs \leq 1.0$, $0.8 \leq ys \leq 1.2$ and $0.0 \leq zs \leq 1.0$.

The following condition can be met in this respect: $0.5 \leq xs \leq 0.9$, $0.8 \leq ys \leq 1.2$ and $0.0 \leq zs \leq 0.5$.

In accordance with a further development, the composition of the spinel powder particles which are used for the layer in the green state should lie within the further composition range given, in particular within the narrower given composition range.

The perovskite phase used should be formed from a non-stoichiometric perovskite in accordance with the formula $(Ln^p_{1-xp}E^p_{xp})_{1-zp}M^pO_{3-\delta}$, where $0 \leq xp \leq 0.35$, $0.5 \leq zp \leq 0.03$, where $Ln^p$ is at least one metal from the group of rare earths (in particular from the group Y, La), $E^p$ is at least one metal from the group of alkaline earth metals (in particular from the group Ca, Sr) and $M^p$ is at least one metal from the group of transition metals (in particular from the group Mn, Cu, Ni, Co and Fe). "δ" in this respect represents the oxygen vacancies in the crystal lattice which result from the valences on the $B^p$ lattice site and optionally also on the $A^p$ lattice site of the perovskite crystal structure.

The composition of the perovskite powder particles which are used for the layer structure in the green state should lie within the given composition range.

In accordance with a further development, the ceramic sintered layer structure can have at least one metal oxide phase. The metal oxide phase is a phase which can be distinguished crystallographically from the above-named spinel phase and the above-named perovskite phase. It is in particular formed by a solid solution of metal oxides which can generally have metals from the group of rare earths, alkaline earth metals and transition metals. The solid solution in particular comprises metal oxides of at least two metals of the metals $M^a$ contained in the sintering additive, in particular of all metals of the metals $M^a$ contained in the sintering additive. The metal oxide phase itself can in this respect have one or more crystallographic phases in dependence on the composition and on the portions of the starting powders. In this respect, each crystallographic phase of the metal oxide phase is in particular formed by a solid solution of metal oxides of at least two metals. In this respect, a phase of the metal oxide phase can generally also comprise a perovskite crystal structure or a spinel crystal structure. However, since the metal oxide phase comprises a composition of metals different from the "perovskite phase" and the "spinel phase", this can be distinguished crystallographically from the phases designated as the "perovskite phase" and as the "spinel phase". The "perovskite phase" is namely largely characterized by the perovskite powder particles with respect to the crystal structure and the composition. Accordingly, the "spinel phase" is largely characterized by the spinel powder particles with respect to the crystal structure and the composition. In this respect, a "solid solution of metal oxides of at least two metals" is understood such that the atoms of the at least two metals are mixed together in the corresponding mixed oxide compound such that the mixed oxide compound forms a uniform crystallographic phase.

In accordance with a further development, the metal oxide phase can be formed in accordance with the formula $((Ln^aO_{1.5})_{1-xa}(E^aO)_{xa})_{ya}$—$(CuO)_{za1}$—$(NiO)_{za2}$—$(CoO)_{za3}$—$(Fe_2O_3)_{za4}$—$(Mn_2O_3)_{0.5ya+za5}$, where $0 \leq xa \leq 0.1$, $0 \leq ya \leq 0.05$, $(za1+za2+za3) \leq 1$ and $(za4+za5) \leq 1$, where $Ln^a$ is at least one metal from the group of rare earths and $E^a$ is at least one metal from the group of alkaline earth metals. The metals $Ln^a$ and $E7^a$ are in particular installed from the perovskite powder particles into the metal oxide phase. They are in particular elements from the group La, Y, Ca, Sr. It is expressed by the dashes between the individual parentheses that the respective metal oxides given in the parentheses are not present as individual metal oxides (and thus as individual, distinguishable crystallographic phases), but that they each form a solid solution with at least one further metal oxide of a further metal. In this respect, exactly one or also a plurality of crystallographic phases can occur within the formula, with each of them forming a solid solution of metal oxides of at least two metals.

In the event that the ceramic sintered layer structure comprises two or more phases, the crystallites of this phase are preferably distributed finely and substantially statistically within the ceramic sintered layer structure.

In accordance with a further development, the ceramic sintered layer structure is formed by at least two part layers formed on one another, with the second part layer having a higher portion of the perovskite phase than the first part layer and can in this respect also have a higher porosity. Measurements at ceramic layer structures in accordance with the invention having two part layers have shown that the porosity of the second part layer which has a perovskite phase as a rule lies at least in the range of the porosity of the first part layer which has not perovskite phase. The porosity of the second part layer should, however, be higher than that of the first part layer which lies on the side facing the interconnect. It should in particular be ≤50 vol. %. In the first part layer, in particular the portion of the spinel phase is between 90 vol. % and 99.8 vol. %, the portion of the metal oxide phase is between 0.1 vol. % and 5 vol. % and the portion of the perovskite phase is between 0.1 vol. % and 5 vol. %. In the second part layer, in particular the portion of the spinel phase is between 0.1 vol. % and 50 vol. %, the portion of the metal oxide phase is between 0.1 vol. % and 5 vol. % and the portion of the perovskite phase is between 50 vol. % and 99.8 vol. %. The second part layer or a third part layer can optionally also be formed only by a perovskite phase. Such a third part layer can then directly contact the surface of the cathode or can be connected to this surface.

The measurement process which can be used for determining the respective volume portions of the different phases will be explained below.

In accordance with a further development, the ceramic sintered layer structure can have an electrical conductivity of at least 25 S/m (S: Siemens) at a temperature of 850° C. Reference is made to the description of FIG. 6 with respect to the measurement process.

The following steps can be carried out in the manufacture:

A) Manufacturing a paste of powder particles and a liquid, wherein the powder particles at least comprise spinel powder particles and sintering additive powder particles, and wherein the sintering additive is formed by (a) metal oxide(s) of at least one metal $M^a$, wherein in this respect at least one of the oxides NiO, CuO, $CoO_x$ and $MnO_x$ named in the following is contained; and B) Applying the paste as a layer to a substrate which is formed by an interconnect or by a cathode of a solid oxide fuel cell;

C) Repeating the steps A) and B), wherein powder particles of at least spinel powder particles and sintering additive powder particles having a smaller portion and additionally perovskite powder particles are contained in the paste to form a second part layer.

These method steps can be repeated a multiple of times, with the portion of spinel and sintering additive being successively reduced and the portion of perovskite being successively increased.

A layer structure in the green state can thereby be manufactured.

In the manufacture, the layer structure of green strength is sintered in a heat treatment to obtain a ceramic sintered layer structure using the layer structure.

The manufacturing process has the advantage that both the layer structure in the green state and the ceramic sintered layer structure can be manufactured easily and inexpensively. Through the manufacture of the paste (or suspension), the starting powders can be processed simply and can be applied in layer form to a substrate. A production in high volumes is possible. Practically no powder waste occurs in this process. The ceramic sintered layer structure manufactured using the manufacturing process has excellent properties with respect to the protective function and the electric conductivity.

In accordance with a further development, the step of sintering can take place after the joining together of at least the interconnect, of the layer structure (in the green state) and of the cathode, in particular after joining together a total stack of solid oxide fuel cells (of the plurality of individual cells). In this manner, the connection of the interconnect to the cathode and the sintering of the layer structure take place in one step, which is advantageous with respect to the efficiency of manufacture and to energy consumption. In accordance with an alternative further development, the step of sintering can take place separately in that only the substrate, in particular the interconnect, is sintered together with the layer structure. In this further development, higher sintering temperatures can optionally be utilized.

The powder particles used for manufacturing the paste (spinel powder particles, sintering additive powder particles and optionally perovskite powder particles) in particular have a mean grain size in the range from 0-10 µm, in particular in the range from 1.5-3.5 µm. The liquid can be formed by a solvent (e.g. water, ethanol, etc.) and/or by a binder. After the application of the paste as a layer (cf. step B)), a drying step can additionally take place for vaporizing the liquid components (in particular the solvent), with said drying step also being able to be carried out at slightly elevated temperatures (e.g. at temperatures in the range from 50° C. to 150° C.) in dependence on the solvent and/or binder used. The layer structure (in the green state) thereby obtained can be handled, in particular packed, shipped, etc., relatively free of problems, in particular when a binder is used. Optionally, before the step of sintering, a plurality of part layers, as has been explained above, can also be applied which can also have different compositions and/or portions of the starting powders. The drying step can in this respect be carried out after every application of each part layer.

In accordance with a further development, a wet powder spray process can be used for applying the paste as a layer (cf. step B)). In this respect, in particular the liquid paste is finely atomized using a nozzle (while supplying compressed air) and is applied to the respective substrate (interconnect and/or cathode). Alternative processes by which the application of the paste as a layer can be realized very easily and inexpensively are, for example, screen printing processes, dip coating of the substrate, roll coating and tampoprint processes.

A low-sintering composition can be achieved by the selection in accordance with the invention of low-sintering staring powders in the layer structure (in the green state). A connection having material continuity between the cathode and the interconnect can in particular already be achieved at the sintering temperatures in the range from 700° C. to 950° C. through the layer structure. A suitable range of the sintering temperatures in particular lies between 700° C. and 1100° C. Temperatures in the range from 800° C. to 1050° C. are preferred. The sintering should be carried out in this temperature range over a period of 1 hour to 20 hours, in particular over a period of 1 hour to 5 hours.

Further advantages and functionalities of the invention result with reference to the following description of embodiments and to the enclosed Figures.

There are shown.

Figure 2:
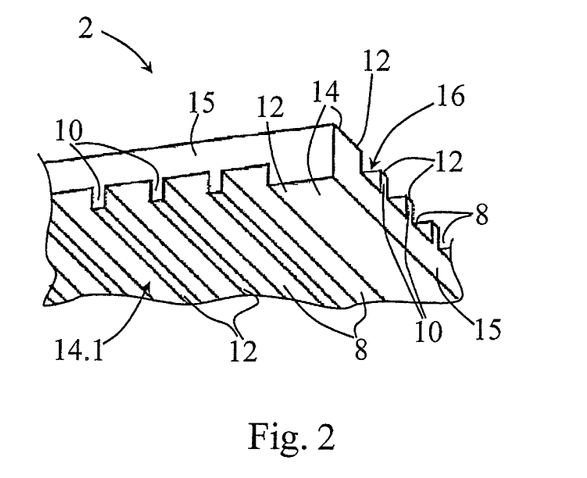
FIG. 2: a schematic partial view of a plate-shaped interconnect.

In FIG. 2, a part of a plate-shaped interconnect 2 having a rectangular base shape is shown schematically. The one surface 14.1 of the interconnect 2 is connected in use to a cathode (not shown), whereas the other surface 16 is connected to an anode (not shown). The gas supply at the cathode side and at the anode side is achieved in the interconnect 2 in that the latter has channels 8 which run parallel to one another in each case at either side and which are separated from one another by through going webs 10. In this respect, the channels 8 of the surface 14.1 at the cathode side extend substantially perpendicular to the channels 8 of the surface 6 at the anode side. In the structure of the interconnect 2 shown, the current-conductive contact surfaces are formed by the top surfaces 12 of the webs 10 (and optionally by some or all of the surfaces of the top surfaces 12 of the somewhat wider webs 14 forming the margin) which are connected to the cathode or to the anode after the joining together of the stack of a plurality of fuel cells via a layer disposed therebetween. As already explained, a layer structure preferably covers the total surface of the interconnect 2 at the cathode side (including the channels 8, webs 10, top surfaces 12, etc.) which is exposed in use to the oxidizing atmosphere. Optionally, the side surfaces 15 of the interconnect 2 can also be covered.

With a layer used only as a contact layer, in contrast, it is sufficient that it only covers the top surfaces 12. It is noted with respect to FIG. 2 that alternatively to the through going webs 10 shown, other contours can also be used on the surfaces 14.1, 16 of the interconnect 2 for distributing the respective gas over the respective surface 14.1, 16, such as segmented webs, knobs or other elevated portions.

Figure 3:
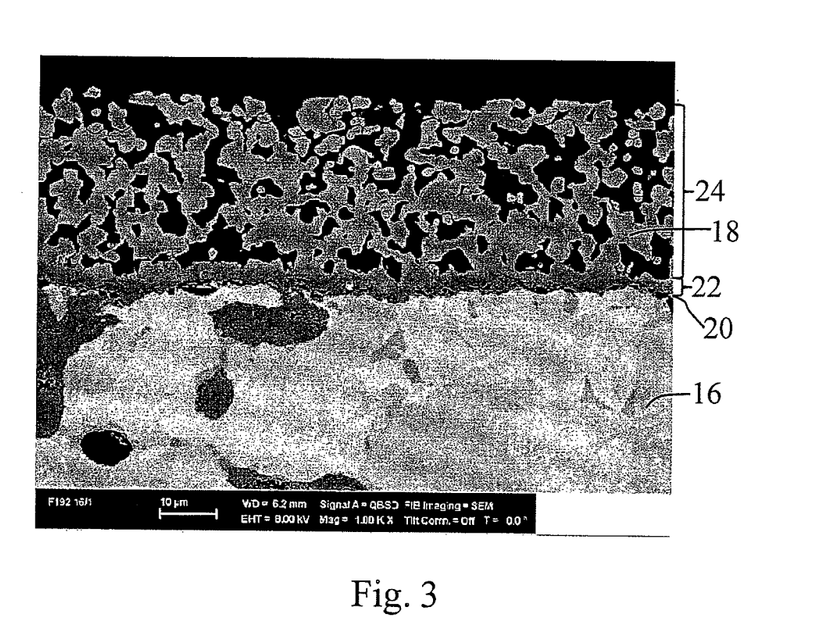
FIG. 3: a scanning electron microscope image of a ceramic sintered layer structure applied to an interconnect in a cross-section as a comparative representation.

In FIG. 3, for comparison, an SEM image of a ceramic sintered layer 18 applied to an interconnect 2 is shown in cross-section. In contrast to a ceramic sintered layer structure in accordance with the invention, only spinel powder particles of a Cu—Ni—Mn spinel (copper nickel manganese spinel) were used for manufacturing this ceramic sintered layer 18 as the starting powder in the associated layer in the green state. The ceramic sintered layer 18 obtained by sintering the layer 18 has a spinel phase as an predominant portion and a secondary oxide phase of an oxide compound containing manganese as a smaller portion.

As can be recognized with reference to FIG. 3, it has a very dense (i.e. low porosity) section/region 22, which his relatively thin, however, directly at the interface 20 to the interconnect 2. It is adjoined above it by a relatively thick section/region 24 which has a much higher porosity.

Figure 4:
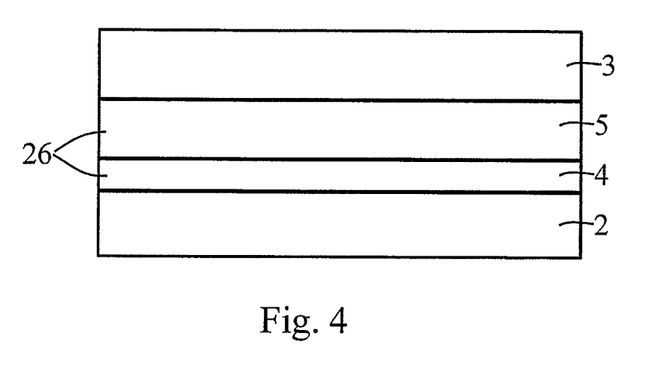
FIG. 4: a schematic representation of the structure of a ceramic sintered layer structure in accordance with the invention in accordance with an embodiment of the invention.

The structure of a ceramic sintered layer structure 26 in accordance with an embodiment of the invention is shown schematically in cross-section in FIG. 4.

Figure 5:
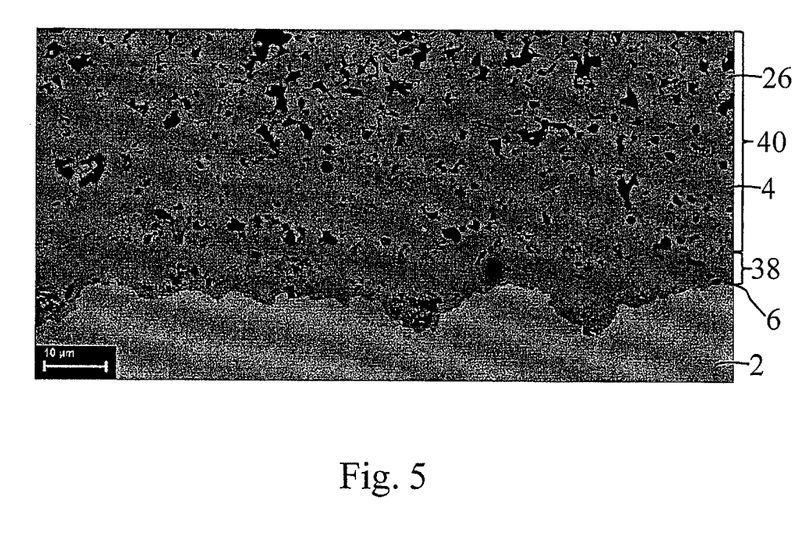
FIG. 5: a scanning electron microscope image (SEM image) of an embodiment of a first part layer of a ceramic sintered layer in accordance with the invention applied to an interconnect in cross-section.
Figure 6:
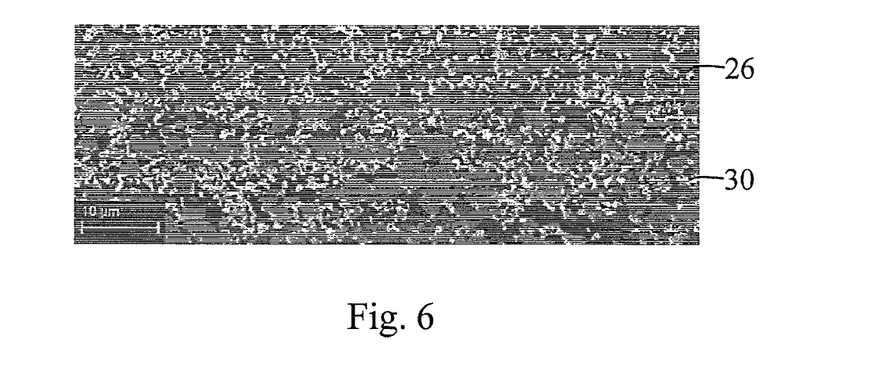
FIG. 6: an SEM image of an embodiment of a second part layer of an example of a ceramic sintered layer structure in accordance with the invention in cross-section.

In this respect, SEM images of details of such a ceramic layer structure 26 are shown in FIGS. 5 and 6. This ceramic layer construction 26 is formed by two part layers 4 and 5 formed on one another. The first part layer 28 is applied directly to an interconnect 2 and covers it over its total surface at the cathode side which is exposed to the oxidizing atmosphere. The second part layer 5 is applied to the first part layer 4 and only covers the current-conductive contact surfaces of the interconnect 2 (for example the top surfaces of webs of the interconnect 2). The second part layer 5 serves as a contact layer.

The interconnect 2 is formed from an alloy on a chromium basis which has a portion of at least 90% by mass chromium. The cathode 3 is formed from lanthanum strontium manganite (LSM) having a perovskite crystal structure. To manufacture the first part layer 4, spinel powder particles of a Cu—Ni—Mn spinel and sintering additive powder particles of the following individual metal oxides were used as starting powders: CuO, NiO, $Mn_2O_3$. A paste was manufactured from this (by mixing with a binder and a solvent) which was applied to the interconnect 2 as a layer and dried. Spinel powder particles of a Cu—Ni—Mn spinel, perovskite powder particles of an La—Sr—Mn perovskite (lanthanum strontium manganese perovskite) and sintering additive powder particles of $Co_3O_4$ were used as the starting powder to manufacture the second part layer 5. A paste was manufactured from this (by mixing with a binder and a solvent) which was applied to the interconnect 2 as a layer and dried. The cathode 3 was applied to this layer in the green state and it was sintered in air atmosphere at 950° C.

In FIG. 4 an SEM image of a ceramic sintered layer structure 26 applied to an interconnect 2 is shown in cross-section, with in FIG. 4 only the first part layer 4 being shown in the upper section and the interconnect 2 being shown in the lower section. The ceramic sintered first part layer 4 is only formed by a spinel phase (apart from further phases which may possibly be present as impurities). It has a very dense (i.e. having very low porosity) section/region 38 directly at the interface 6 to the interconnect 2, said section/region establishing good material continuity to the interconnect 2. This relatively thin section/region 38, which is, however, considerably thicker than the corresponding section/region 22 shown in FIG. 3, is adjoined by a relatively thick section 40 which has a porosity over more than 30 µm which is likewise approximately as low as the thin section/region 38 and a much lower porosity than the corresponding section/region 24 shown in FIG. 3. These properties are advantageous both with respect to the protective function and with respect to the electrical conductivity of the first part layer 4. In FIG. 6 an SEM image of the second part layer 5 of the ceramic sintered layer structure 26 is shown. It also has a perovskite phase and a metal oxide phase in addition to the spinel phase. It has a slightly higher porosity than the first part layer 28. A good material adaptation and a good bonding of the ceramic sintered layer structure 26 to the cathode 3 is made possible by the perovskite phase.

Depending on the cathode material, another perovskite can be added as perovskite powder particles to the layer structure in accordance with the invention in the green state, in particular to a part layer directly adjacent to the cathode 3, so that a perovskite phase corresponding completely or largely to the cathode material also forms in the ceramic sintered layer structure 26 there. Common cathode materials are, for example, lanthanum strontium manganite (LSM), lanthanum strontium cobaltite (LSC) or lanthanum strontium cobalt ferrite (LSCF), which each have a perovskite crystal structure. These materials can accordingly also be added to the layer (or part layer) adjacent to the cathode 3 as perovskite powder particles.

Figure 7:
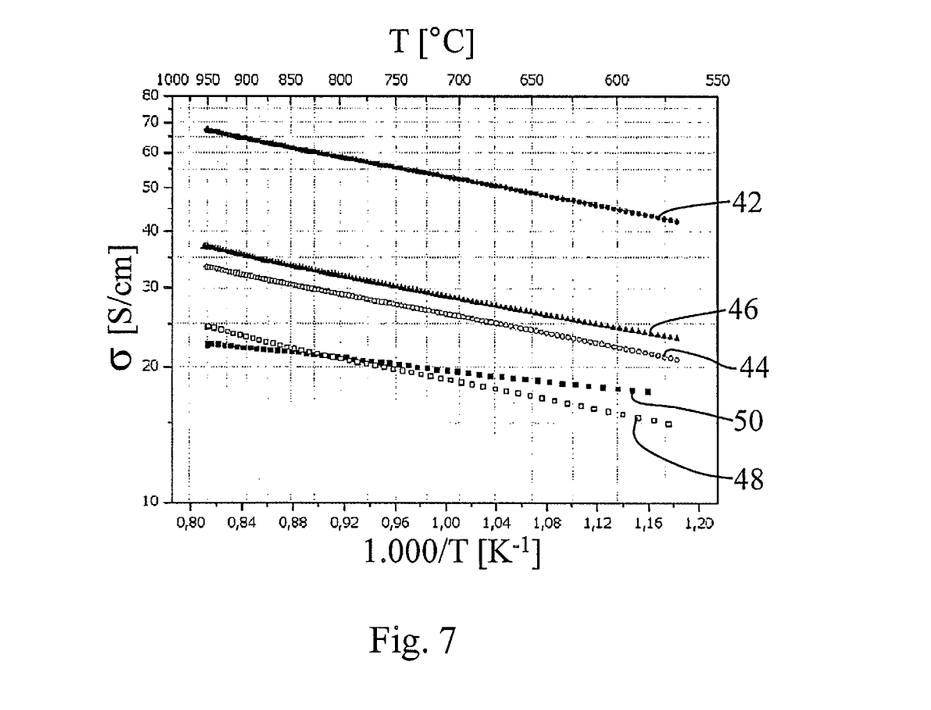
FIG. 7: a diagram in which the electrical conductivity of different compositions of ceramic layer structures is shown in dependence on the temperature.
Figure 8:
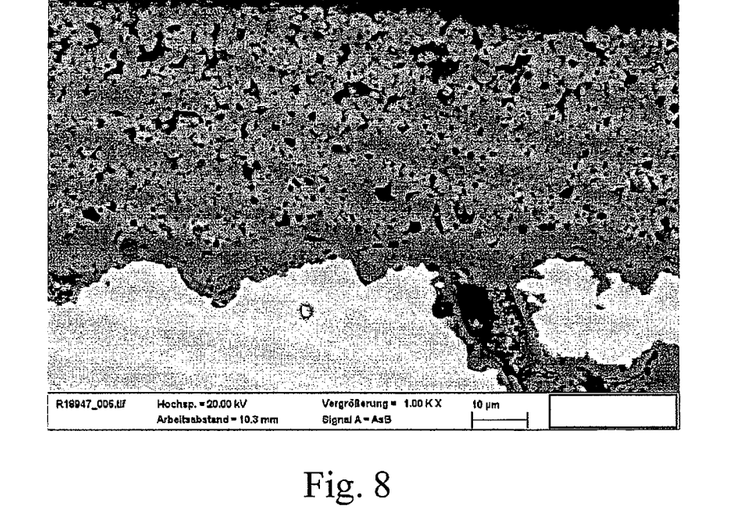
FIG. 8: an SEM image of an example of a ceramic layer structure in accordance with the invention for the explanation of the measurement process.

In FIG. 7 the electrical conductivity of different sintered layer structure compositions is shown in dependence on the temperature. In this respect, the value "1000/temperature" is entered along the x axis on the lower scale in the unit $K^{-1}$ and the temperature is entered on the upper scale in the unit ° C. The conductivity $\sigma$ in the unit S/cm (S: Siemens) is entered along the y axis. Layers having the respective composition were manufactured on an insulator as samples for the conductivity measurements and the conductivity was measured in a four-point measurement. The four contacts were formed in that the sample had a platinum wire wound around at each of the four contact points and the contact to the sample was enhanced by a contact agent (e.g. a gold paste). In FIG. 7, the measurement curve designated by 42 was measured at a screen-printed ceramic sintered layer in accordance with the invention which was formed by a spinel phase of a Cu—Ni—Mn—Fe spinel (copper nickel manganese iron spinel) and was sintered for 3 hours at 1050° C. The measurement curve designated by 44 was measured at a screen-printed ceramic sintered layer structure in accordance with the invention which was formed by a spinel phase of a Cu—Ni—Mn—Fe spinel and which was sintered for 3 hours at 950° C. The electrical conductivity is in this respect somewhat smaller than in the sample which was sintered at 1050° C. It must be taken into account in this respect that the sintering temperature is as a rule restricted to 950° C. when the layer structure in the assembled stack is sintered, said stack comprising at least the interconnect, the cathode and optionally still further elements of the fuel cell. The measurement curve designed by 46 was measured at a screen-printed ceramic sintered layer structure obtained in accordance with the invention which was formed by a spinel phase of a Cu—Ni—Mn—Fe spinel, a perovskite phase of an La—Sr—Mn perovskite and a metal oxide phase and which was sintered for 3 hours at 950° C. The measurement curve designated by 48 was measured at a screen-printed ceramic sintered comparison layer which was sintered for 3 hours at 1050° C. and which comprises a predominant portion of a spinel phase of a Cu—Ni—Mn spinel and a smaller portion of a secondary oxide phase of an oxide compound containing manganese. The measurement curve designated by 50 was measured at a screen-printed ceramic sintered layer which was sintered for 3 hours at 950° C. and which was formed from a perovskite phase of an La—Sr—Mn perovskite.

As can be seen from FIG. 7, the electrical conductivity at the measurement curves designated by 48 and 50 is in each case much worse than with the layer structures in accordance with the invention.

Embodiments for the manufacture of a layer structure in accordance with the invention will be explained in the following.

EXAMPLE 1

30 g of a spinel powder having the composition $Cu_{0.6}Ni_{0.4}Mn_2O_4$ and a mean particle size between 1.5 µm and 3.5 µm is mixed with 1.935 g of a perovskite powder of the composition $La_{0.75}Sr_{0.2}Mn_{0.9}Co_{0.1}O_{3-\delta}$ and a mean particle size between 1.5 µm and 3.5 µas well as 1.520 g CuO, 0.9516 g NiO and 5.0283 g $Mn_2O_3$ (sintering additive powder) in an ethanolic solution and is subsequently homogenized on a roller bench or in a planetary ball mill. The homogeneous powder is dried and screened. The screened powder is mixed with a solvent containing terpineol to which ethyl cellulose had previously been added as a binder and is subsequently homogenized on a three-piece roller such that a highly viscous, flowable paste is created. The paste is applied by a thick film technology such as screen printing or mask printing or roll coating to at least the contact webs (current conducting contact surfaces) of the interconnect 2. However, the complete coating of the interconnect 2 is advantageous in which the contact webs and gas channels are coated. The coating of component edges can also be expedient in individual cases. Depending on the demands, layer thicknesses of 20 μm to 150 μm can be set. During a drying at 100° C., the solvent containing terpineol is vaporized and a first part layer (in the green state) of powder particles and the binding agent ethyl cellulose can thus be formed.

A second part layer 5 is then formed on this first part layer 4. For this purpose, 30 g of a spinel powder having the composition $Cu_{0.6}Ni_{0.4}Mn_2O_4$ and a mean particle size between 1.5 μm and 3.5 μm is used with 45.5 g of a perovskite powder of the composition $La_{0.75}Sr_{0.2}Mn_{0.9}Co_{0.1}O_{3-\delta}$ and a mean particle size between 1.5 μm and 3.5 μm as well as 0.41 g CuO, 0.02 g NiO and 0.135 g $Mn_2O_3$ (sintering additive powder) to manufacture a paste such as described with respect to the first part layer 4 The second part layer 5 like the first part layer can be formed on it or optionally also on the surface of a cathode 3.

The sintering of this layer structure 26 can take place in dependence on the requirements as the end of the interconnect production or within the framework of the stack assembly (joining together of the stack). A ceramic sintered layer structure is obtained by sintering this layer structure.

EXAMPLE 2

$La_{0.75}Sr_{0.2}MnO_{3-x}$, $Cu_{0.6}Ni_{0.4}Mn_2O_4$ and metal oxides (CuO, $Mn_2O_3$, NiO, $Co_3O_4$) were used as the starting materials. For the manufacture of a first part layer (4), 30 g of the spinel powder having the composition $Cu_{0.6}Ni_{0.4}Mn_2O_4$ having a mean particle size between 1.5 mm and 3.5 μm, were mixed with 1.008 g CuO, 0.631 g NiO and 2.2347 g $Mn_2O_3$ in an ethanolic solution and subsequently homogenized on a roller bench or in a planetary ball mill. The homogeneous powder was dried and screened. The screened powder is mixed with a solvent containing terpineol to which ethyl cellulose had previously been added as a binder and is subsequently homogenized on a three-piece roller such that a highly viscous, flowable paste is created. The paste was applied to the gas webs of an interconnect 2 by a thick-film technique such as screen printing or mask printing or roll coating. However, the complete coating of the interconnect 2 is advantageous in which the contact webs and gas channels are coated. Depending on the coating, the thickness of the layer should be 20 μm to 200 μm.

Figure 1:
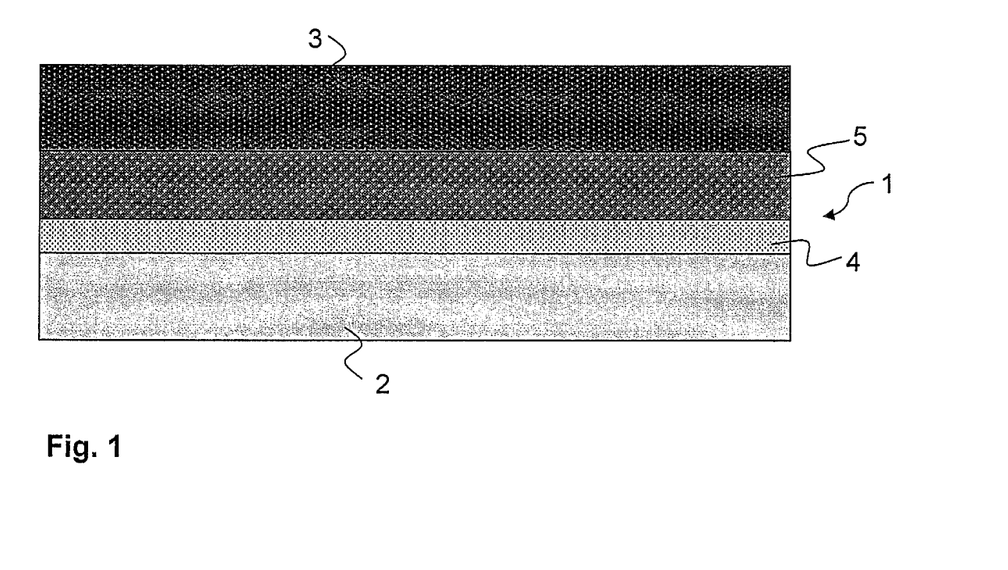
FIG. 1: in schematic form, a layer structure such as can be manufactured, for example, in accordance with Example 2.

For the manufacture of a second part layer 5, 20 g of the spinel powder having the composition $Cu_{0.6}Ni_{0.4}Mn_2O_4$ (having a mean particle size between 1.5 μm and 3.5 μm) were mixed with 24.5335 g $La_{0.75}Sr_{0.2}MnO_{3-x}$ (having a mean particle size between 1.5 μm and 3.5 μm) and 2.42 g $Co_3O_4$ in an ethanolic solution and subsequently homogenized on a roller bench or in a planetary ball mill. The homogeneous powder was dried and screened. The screened powder was mixed with a solvent containing terpineol to which ethyl cellulose had previously been added as a binder and was subsequently homogenized on a three-piece roller such that a highly viscous, flowable paste was created. The paste was applied to the cathode of a fuel cell by a thick-film technique such as screen printing or mask printing or roll coating. The complete coating is, however, advantageous. The thickness of the layer should advantageously lie in the range 20 μm to 100 μm depending on the coating. Such a layer structure 1 is shown schematically in FIG. 1 with the two part layers 4 and 5.

After the drying of the layer structures 1, the prepared interconnect plates and coated fuel cells were alternately assembled to form a stack. After the insertion onto a metal plate with a gas supply device, this stack was heated to 800-950° C., preferably 930° C., for 2 hours to 6 hours and was then ready for use.

In the following, measurement processes will be explained for determining the porosity, the mean pore diameter, the portions of the respective phases of the ceramic sintered layer and for determining the mean grain size of the spinel phase of the ceramic sintered layer structure. These measurement processes are in particular to be used with respect to the respective given range data and limit values. First, a sample preparation is described which can be used for all measurement processes. For this purpose, cross-section polished areas of interconnects which are each coated with a ceramic sintered layer structure in accordance with the invention are manufactured perpendicular to its surface (and perpendicular to the layer plane). For this purpose, pieces were sawn out of an interconnect using a diamond wire saw, these pieces were fixed in an embedding means (for example epoxy resin) and were ground after hardening (using respectively finer sand paper successively). The samples were subsequently polished using a polish suspension and were finally electrolytically polished. A very thin gold film was applied via a sputtering process for the subsequent analysis at the SEM and thus an electrically conductive ground surface was produced.

In the following, the measurement process will be described for determining the portions of the respective phases (in vol. %) within the ceramic sintered layer structure. This determination takes place using an EBSD analysis (ESBD: electron backscatter diffraction) by which the crystallographic structure can be determined locally and the most probable orientation of the individual crystallites. For this purpose, an image of a sample is taken with a high-resolution scanning electron microscope (SEM) with an EBSD detector (SEM used in the present case: "Ultra Plus 55" from Zeiss). For this purpose, the sample is positioned at a tilt angle of 70° beneath the primary electron beam. Some of the electrons are diffracted in the course of the interaction with the sample. The ESBD detector registers these electrons and represents a diffraction image. The crystallographic phases to be expected are selected in a database, with the possible diffraction images for each of these phases being stored. In his manner, the crystallographic phase and the most probable orientation can be assigned to each measurement point on the sample by the comparison with the database. A map of the phases in the ceramic sintered layer structure can be prepared by scanning the probe. The surface portion of the individual phases can be determined from these images using stereological processes. The pores are not taken into account in the determination of the surface portion of the individual phases. The determined surface portion of a phase simultaneously corresponds to the portion in vol. % of this phase.

The measuring process for determining the mean grain size of the spinel phase of the ceramic sintered layer structure is carried out using the same settings explained above (with respect to the measurement process for determining the portions of the respective phases) and optionally also at the same SEM image. For this purpose, only the regions in the SEM image are evaluated in which the spinel phase is present. The determination of the mean grain size of the spinel phase within these regions is carried out using the software module "QX-Grain" according to ASTM E112-96.

Figure 9:
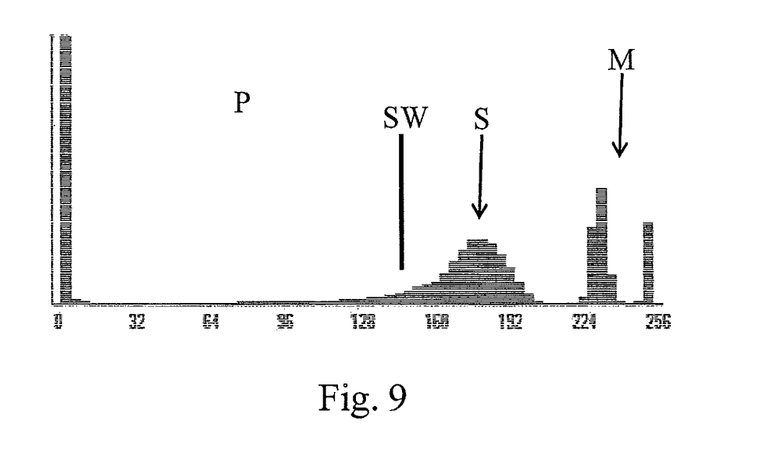
FIG. 9: a gray scale spectrum of the SEM image shown in FIG. 7 for the explanation of the measurement process.

In the following, measurement processes are explained with reference to FIGS. 7 and 8 for determining the porosity and the mean pore diameter of a ceramic sintered layer structure. An SEM image is taken of the sample to be examined, with in the present case the SEM given above and a BSE detector (BSE: backscattered electrons) (BSE detector or 4-quadrant ring detector) being used. The settings used are as follows: Tilt angle: 0°, acceleration voltage of 20 kV, working distance of approx. 10 mm and 1000-fold magnification (device rating), which results in a horizontal image edge of approximately 150 µm. In this respect, special value was placed on a very good image sharpness. The setting of the brightness and of the contrast in the SEM image and the fixing of the threshold value are substantial influences on the measurement parameters of the porosity and of the mean pore diameter. The setting of these parameters takes place as will be explained in the following. The SEM image includes substantially the same portions of a metallic substrate located beneath the layer and an embedding means located above the layer, as is shown, for example, with reference to the SEM image shown in FIG. 8 of a ceramic sintered layer structure obtained in accordance with the invention. The brightness and contrast were selected such that the total gray scale spectrum is ideally utilized with 256 steps. This can be seen with reference to FIG. 9 in which the substantially Gaussian curve peak—S—is formed by the coating material of the ceramic sintered layer structure, the two peaks—M—in the high gray scale range (corresponds to high brightness) are formed by the metallic substrate (here: interconnect) and the intensities—P—below the threshold value—SW—by the pores (at least partly) filled with embedding means and also by the embedding means provided above the ceramic sintered layer structure. The mean gray stage value of the total SEM image was always in the range between 150 and 200, as a rule within the narrower range from 170 to 190, in the measurements carried out.

The following procedure is used for determining the position of the threshold value. A Gaussian curve is placed into the intensity distribution—S—of the coating material such that this Gaussian curve is fitted (or adapted) to the flank of the intensity distribution disposed at the right in FIG. 9 (i.e. the flank of brighter gray stages). As can be seen with reference to FIG. 9, the left flank (corresponds to the flank of darker gray stages) of the intensity distribution—S—of the coating material is asymmetric and adopts higher intensity values in its run-out than the right flank. This intensity, which is increased with respect to the right flank, is already caused by the pores contained in the respective layer. Accordingly, the threshold value—SW—is to be determined such that the asymmetry of the left flank caused by the pores is also taken into account for determining the porosity and the mean pore diameter, but not the portion of the intensity caused by the coating material. This takes place in that the threshold value—SW—is placed into the left flank of the intensity distribution—S—of the coating material such that the Gaussian curve which was, as stated above, placed into the intensity distribution of the coating material has to have fallen on the side of the left flank to at least 0.5% of the maximum value of the intensity distribution—S—of the coating material. All regions within the measurement surface to be evaluated which have a gray scale below the threshold value—SW—(i.e. are darker than the threshold value) are identified as pores and are used for determining the porosity (and the mean pore diameter) by determining the threshold value—SW—. The threshold value must in this respect be fixed separately for each SEM image. The measurement surface to be evaluated, which is rectangular as a rule, is placed completely within the region covered by the ceramic sintered layer structure in the SEM image. It in particular comprises the total width of the SEM image (i.e. 150 µm). Its height corresponds to the height region over which the porosity or the mean pore diameter (or also another parameter) has to be determined. If, for example, it is to be determined whether the ceramic sintered layer structure has a porosity and/or a mean pore diameter below a respective limit value over a thickness of at least 10 µm, the measurement surface to be evaluated can in particular have a height of 10 µm (or slightly more) and a check can be made by positioning the measurement surface to be evaluated at different heights or thickness regions of the ceramic sintered layer structure of whether these properties are present in at least one height section or thickness section within the ceramic sintered layer structure. The SEM image is quantitatively evaluated within the measurement surface to be evaluated in each case using stereological methods (software used: "Leica OWin").

In the measurement processes for determining the porosity, the pores are also taken into account which only partially lie within the measurement surface to be evaluated. The surface portion of the pores relative to the total measurement surface to be evaluated is determined within the course of the porosity measurement. This surface portion simultaneously corresponds to the porosity in vol. %. The determination of the mean pore diameter is carried out using the software module "QX-Grain" according to ASTM E112-96.

The invention claimed is:

1. A layer structure, useful for forming a ceramic layer between a chromium-alloy-containing interconnect and a cathode of a solid oxide fuel cell, the layer structure comprising in a green state in the absence of chromium,
    i) a powdery spinel,
    ii) at least one metal oxide of a metal selected from the groups consisting of Cu, Ni, Co, and Mn as a sintering additive, and
    iii) at least one powdery perovskite,
wherein the spinel with the metal oxide constitutes a portion that reduces starting from the side for facing the interconnect in the direction of the side for facing the cathode, and wherein the perovskite constitutes a portion that reduces starting from the side for facing the cathode in the direction of the side for facing the interconnect.

2. A layer structure in accordance with claim 1, characterized in that the layer structure is formed from at least two sub layers having different consistencies.

3. A layer structure in accordance with claim 1, characterized in that a non-stoichiometric perovskite is used as the perovskite in which the $A^p$ lattice site of the perovskite crystal structure $A^pB^pO_3$ is occupied by at least one metal from the group of chemical elements La, Sr, Ca and Y and the W lattice site is occupied by at least one metal of the group of chemical elements Mn, Ni, Co and Fe.

4. A layer structure in accordance with claim 1, characterized in that $(Cu_{xs}Ni_{1-xs})_{ys}(Mn_{1-zs}Fe_{zs})_2O_4$, where $0 \leq xs \leq 1.0$, $0.8 \leq ys \leq 1.2$ and $0.0 \leq zs \leq 1.0$, is contained as the spinel.

5. A layer structure in accordance with claim 1, characterized in that $(Ln^p_{1-xp}E^p_{xp})_{1-zp}M^pO_{3-\delta}$, where $0 \leq xp \leq 0.35$, $0.0 \leq zp \leq 0.03$ is contained as the perovskite, wherein $Ln^p$ is at least one metal from the group of rare earths, $E^p$ is at least one metal from the group of alkaline earth metals and $M^p$ is at least one metal from the group of transition metals.

6. A layer structure in accordance with claim 1, characterized in that the layer structure has a portion of 65% by mass to 95.9% by mass of spinel powder particles, a portion of 4% by mass to 29% by mass of metal oxide sintering additive powder particles, and a portion of 0.1% by mass to 6% by mass of perovskite powder particles at the side facing the interconnect.

7. A layer structure in accordance with claim 1, characterized in that the layer structure has a portion of 0.1% by mass to 45% by mass of spinel powder particles, a portion of 0.1% by mass to 0.5% by mass of metal oxide sintering additive powder particles, and a portion of 50% by mass to 99.8% by mass of perovskite powder particles at the side for facing the cathode.

8. A layer structure in accordance with claim 1, characterized in that the region of the layer structure for directly contacting the cathode.

9. A layer structure in accordance with claim 1, characterized in that perovskite Which corresponds to the cathode material is contained in the layer structure.

10. A product produced by sintering the layer structure in accordance with claim 1 between a chromium-alloy-containing interconnect and a cathode of a solid oxide fuel cell thereby forming a ceramic layer having a spinel phase and perovskite phase, wherein the portion of spinel is reduced starting from the side facing the interconnect in the direction of the side facing the cathode and the portion of perovskite is reduced starting from the side facing the cathode in the direction of the side facing the interconnect, and wherein the ceramic layer has an interface region facing toward the interconnect with a porosity ≤25% and/or a mean pore diameter ≤1 µm over a thickness of at least 10 µm.

11. The product in accordance with claim 10, characterized in that the porosity of the ceramic layer becomes larger in the direction of the cathode.

12. The product in accordance with claim 10, characterized in that the ceramic layer has at least two sub layers adjacent to the interface region facing in the direction of the cathode.

13. The product in accordance with claim 10, characterized in that the spinel phase is formed in accordance with the formula $(Cu_{xs}Ni_{1-xs})_{ys}(Mn_{1-zs}Fe_{zs})_2O_4$, where $0 \le xs \le 1.0$, $0.8 \le ys \le 1.2$ and $0.0 \le zs \le 1.0$.

14. The product in accordance with claim 10, characterized in that the perovskite phase is formed from a non stoichiometric perovskite in accordance with the formula $(Ln^p_{1-xp} E^p_{xp})_{1-zp}M^pO_{3-\delta}$, where $0 \le xp \le 0.35$, $0.0 \le zp \le 0.03$, wherein, in the perovskite phase, $L^p$ is at least one metal from the group of rare earths, $E^p$ is at least one metal from the group of alkaline earth metals and $M^p$ is at least one metal from the group of transition metals.

15. The product in accordance with claim 10, characterized in that a metal oxide phase is formed in the ceramic layer in accordance with the formula $((Ln^aO_{1.5})_{1-xa}(E^aO)_{xa})_{ya}$—$(CuO)_{za1}$—$(NiO)_{za2}$—$(CoO)_{za3}$—$(Fe_2O_3)_{za4}$—$(Mn_2O_3)_{0.5ya+za5}$, where $0 \le xa \le 0.1$, $0 \le ya \le 0.05$, $(za1+za2+za3) \le 1$ and $(za4+za5) \le 1$, wherein $Ln^a$ is at least one metal from the group of rare earths and $E^a$ is at least one metal from the group of alkaline earth metals.

16. The product in accordance with claim 10, characterized in that a metal oxide phase is formed as a solid solution of metal oxides in the ceramic layer, wherein the metal oxide phase is formed in accordance with the formula $((Ln^aO_{1.5})_{1-xa}(E^aO)_{xa})_{ya}$—$(CuO)_{za1}$—$(NiO)_{za2}$—$(CoO)_{za3}$—$(Fe_2O_3)_{za4}$—$(Mn_2O_3)_{0.5ya+za5}$, where $0 \le xa \le 0.1$, $0 \le ya \le 0.05$, $(za1+za2+za3) \le 1$ and $(za4+za5) \le 1$ wherein $Ln^a$ is at least one metal from the group of rare earths and $E^a$ is at least one metal from the group of alkaline earth metals.

17. The product in accordance with claim 10, characterized in that the ceramic layer contains chromium in a chemically bound form in an interface region.

* * * * *